US012632377B2

(12) United States Patent
Gonzales et al.

(10) Patent No.: US 12,632,377 B2
(45) Date of Patent: May 19, 2026

(54) BLOCK STATUS PARITY DATA IN MEMORY

(71) Applicant: Micron Technology, Inc., Boise, ID (US)

(72) Inventors: John M. Gonzales, Boise, ID (US); Christopher G. Wieduwilt, Boise, ID (US); Seth A. Eichmeyer, Boise, ID (US); Matthew D. Jenkinson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 18/778,600

(22) Filed: Jul. 19, 2024

(65) Prior Publication Data

US 2025/0061058 A1 Feb. 20, 2025

Related U.S. Application Data

(60) Provisional application No. 63/519,581, filed on Aug. 15, 2023.

(51) Int. Cl.
*G06F 12/02* (2006.01)
*G06F 11/10* (2006.01)

(52) U.S. Cl.
CPC ...... *G06F 12/0246* (2013.01); *G06F 11/1076* (2013.01)

(58) Field of Classification Search
CPC ............. G06F 12/0246; G06F 11/1076; G06F 11/1048; G11C 29/42
See application file for complete search history.

(56) References Cited

U.S. PATENT DOCUMENTS

| | | | |
|---|---|---|---|
| 9,274,958 B1 * | 3/2016 | Korotaev | G06F 16/1847 |
| 11,948,655 B2 | 4/2024 | Eichmeyer et al. | |
| 2006/0239075 A1 * | 10/2006 | Williams | G11C 16/10 |
| | | | 365/185.17 |
| 2008/0288712 A1 * | 11/2008 | Cornwell | G06F 11/0748 |
| | | | 711/E12.008 |
| 2013/0269039 A1 * | 10/2013 | Gold | G06F 21/64 |
| | | | 726/27 |
| 2013/0346671 A1 * | 12/2013 | Michael | G06F 3/0679 |
| | | | 711/E12.008 |
| 2016/0070496 A1 * | 3/2016 | Cohen | G06F 3/0644 |
| | | | 711/103 |
| 2019/0303283 A1 * | 10/2019 | McGlaughlin | G06F 3/0616 |
| 2020/0065025 A1 * | 2/2020 | Hong | G06F 3/0614 |
| 2021/0103388 A1 * | 4/2021 | Choi | G06F 11/1068 |
| 2021/0304009 A1 * | 9/2021 | Bazarsky | G06N 3/06 |
| 2023/0315918 A1 | 10/2023 | Eichmeyer et al. | |
| 2025/0061020 A1 * | 2/2025 | Gonzales | G06F 11/1068 |
| 2025/0061058 A1 * | 2/2025 | Gonzales | G06F 11/1076 |

* cited by examiner

*Primary Examiner* — Ramon A. Mercado
(74) *Attorney, Agent, or Firm* — Brooks, Cameron & Huebsch, PLLC

(57) ABSTRACT

Apparatuses, systems, and methods for block status parity data are described. An example method includes storing block status data associated with at least one block of a non-volatile memory that indicates a status of the at least one block of memory within a controller. The example method further comprises storing parity data that corresponds to the block status data. The example method further comprises prior to writing the block status data to the non-volatile memory, comparing the stored block status data to the parity data.

13 Claims, 4 Drawing Sheets

*360*

STORE BLOCK STATUS DATA ASSOCIATED WITH AT LEAST ONE BLOCK OF A NON-VOLATILE MEMORY THAT INDICATES THE STATUS OF THE AT LEAST ONE BLOCK OF MEMORY WITHIN A CONTROLLER —*362*

STORE PARITY DATA THAT CORRESPONDS TO THE BLOCK STATUS DATA —*364*

PRIOR TO WRITING THE BLOCK STATUS DATA TO THE NON-VOLATILE MEMORY, COMPARE THE STORED BLOCK STATUS DATA TO THE PARITY DATA —*366*

BLOCK STATUS PARITY DATA IN MEMORY

PRIORITY INFORMATION

This application claims the benefit of U.S. Provisional Application No. 63/519,581, filed on Aug. 15, 2023, the contents of which are incorporated herein by reference.

TECHNICAL FIELD

Embodiments of the disclosure relate generally to semiconductor memory and methods, and more particularly, to apparatuses, systems, and methods related to block status parity data.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
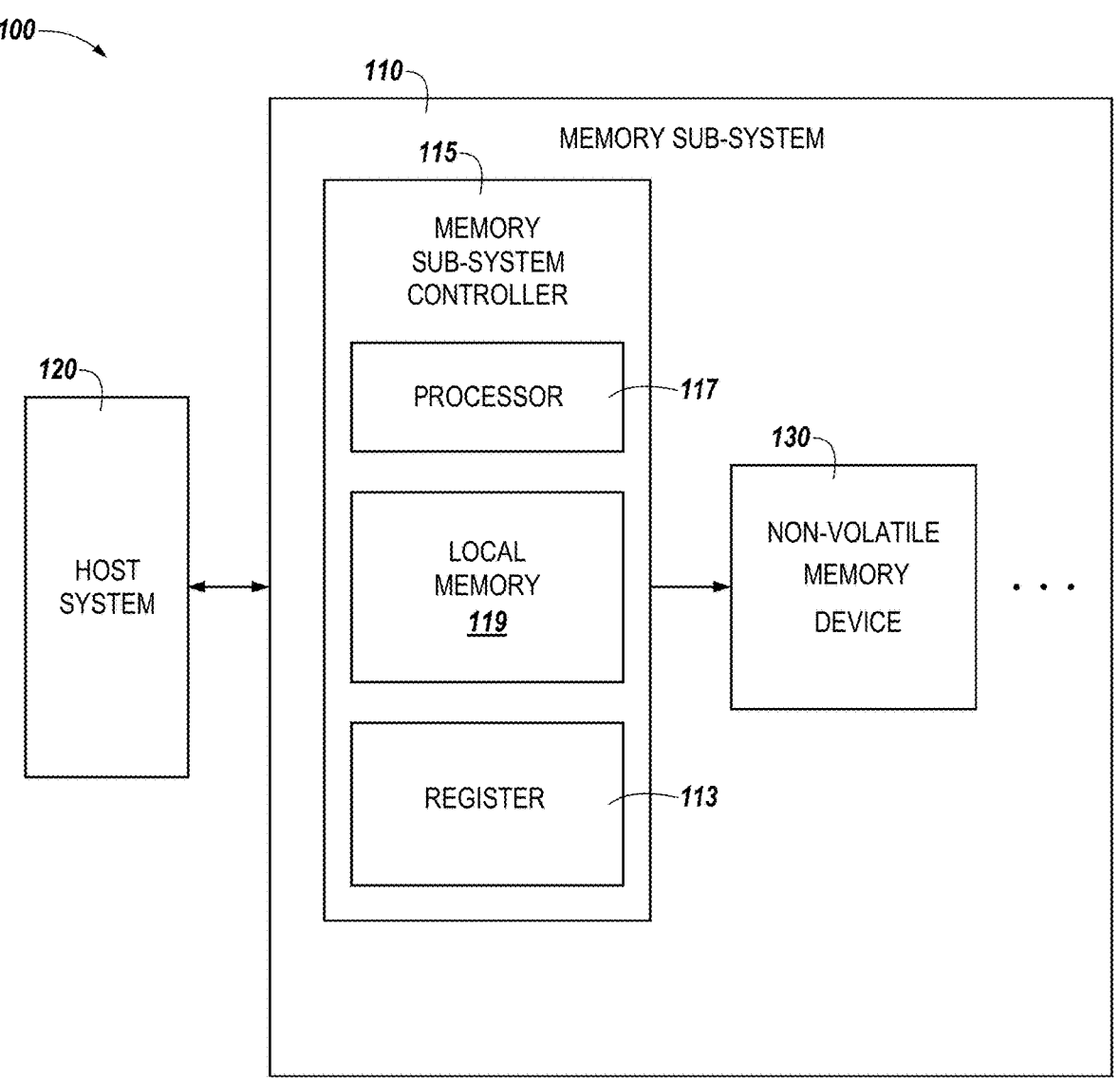
FIG. 1 illustrates an example computing environment that includes a memory sub-system in accordance with some embodiments of the present disclosure.

Apparatuses, systems, and methods for block status parity data in memory are described. A memory device can be a non-volatile memory device. One example of a non-volatile memory device is a flash memory system. Other examples of non-volatile memory devices are described below in conjunction with FIG. 1. A memory device can include a physical block of memory cells (e.g., a collection of data). The memory device can be coupled to a controller within a memory sub-system.

A memory sub-system can be a storage system, storage device, a memory module, or a combination of such. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory operation (e.g., a read, write, or other memory operation) can be initiated to read data from and/or write data to store data in a memory device of the memory sub-system. A controller of the memory sub-system can store block status data that indicates a status of the block, e.g., whether each block of a plurality of blocks in the memory device is a bad block (e.g., the block is invalid, unable to properly store data, stores invalid data, etc.) or a good block (e.g., the block is valid, stores correct data, is still functioning properly, etc.). The controller can store the indication of whether one of the plurality of blocks is bad in a register of latches. The block status data within the register of the controller can be written (e.g., copied) to the memory device so that the memory device also stores data on whether each block is a good (properly storing data) or a bad (not able to properly store data) block. In some instances, an event can cause a latch to store incorrect data and indicate that a good block is a bad block or a bad block is a good block. This event can be referred to as a latch upset event.

A latch upset event can cause the controller to identify a block of memory as a bad or invalid block and prevent access to the block of memory although the block of memory within the non-volatile memory is still "good" or valid. A latch upset event can be caused by a neutron strike. As used herein, the term "neutron strike" refers to the interaction between one or more neutrons and a component of the memory device. The component can include, but is not limited to, an array of memory cells, latches, and logic circuitry. The errors can include, but are not limited to, changing the memory address stored in a latch or flipping a data bit. A processor on or coupled to the memory device can include error correction code (ECC) circuitry to correct the errors. However, if the number of errors exceeds the ability of the ECC circuitry to correct the errors, the memory device may function improperly.

Aspects of the present disclosure address the above and other deficiencies by providing parity data associated with the block status data in the register to detect when the block status data in the register has been changed unintentionally due to a latch upset event, such as, for example, due to a neutron strike on the register. The parity data can be used to protect the block status data. The parity data can be stored within the controller, in a location separate from the register within the controller, and/or in a number of other memory locations. In order to check the validity of the block status data (e.g., an indication of the validity of the block of memory), a parity value can be determined for the block status data and be compared with the parity data. In the event that the two values do not match, the block status data can be determined to be in error and previously stored block status data can be reloaded. In the event that the two values do match, a determination that the block status data is still valid can be made and the block status data can be used, e.g., loaded to the memory device to indicate which blocks to use or not use in the memory and/or read or write operations can be sent based on the block status data in the register to avoid using bad blocks.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130). In other embodiments, the memory sub-system 110 can include volatile memory devices and/or a combination of volatile memory devices and non-volatile memory devices.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory device 130 can include any combination of the different types of non-volatile memory devices and/or volatile memory devices. The volatile memory devices can be, but are not limited to, random access memory (RAM), such as dynamic random-access memory (DRAM) and synchronous dynamic random access memory (SDRAM). The non-volatile memory devices (e.g., memory device 130) can be, but are not limited to, negative-and (NAND) type flash memory and write-in-place memory. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 as well as convert responses associated with the memory device 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system controller 115 includes at least a portion of a register 113. For example, the memory sub-system controller 115 can include a processor 117 (processing device) configured to execute instructions stored in local memory 119 for performing the operations described herein using the register 113.

The memory sub-system controller 115 includes a register 113 that can be configured to partially or entirely store block status data associated with at least one block within the non-volatile memory device 130. Data within the memory device 130 can be stored within a plurality of physical blocks of memory cells (e.g., a collection of data). The controller 115 can store block status data associated with at least one block of memory cells in the non-volatile memory device 130. The status data can indicate the validity of at least one block of memory. For example, the block status data can indicate whether data within the at least one block of memory is valid or invalid and/or whether the block is capable of holding data without introducing an error (e.g., a "good" block can store data properly and a "bad" block is prone to errors). The register 113 can store block status data that indicates which blocks of memory cells in the non-volatile memory device 130 are valid or invalid. For example, the register 113 can include one or more latches that are configured to store an indication whether a block of the plurality of blocks of memory is a "good" block or a "bad" block. For example, the latch can store a "1" for a good block and a "0" for a bad block, etc. The block status data within the register 113 can be copied to the non-volatile memory device 113 at particular time intervals (described in further detail in FIG. 2). Although not shown in FIG. 1 so as to not obfuscate the drawings, the register 113 can include various circuitry to facilitate data storage. For example, the register 113 can include special purpose circuitry in the form of an ASIC, FPGA, state machine, and/or other logic circuitry that can allow the register 113 to store block status data.

The memory sub-system controller 115 can further include parity data. Parity data can be located in memory within the controller and/or within the blocks of memory in the non-volatile memory device 130. The parity data can track block status data for the blocks of memory cells in the non-volatile memory device 130. The parity data can track which blocks of memory cells in the non-volatile memory device 130 are invalid. The parity data can be stored within the memory sub-system controller 115, in a location separate from the register 113 within the memory sub-system controller 115, or within the non-volatile memory 130, for example. The block status data within the register 113 can be compared to the parity data. For example, a parity value can be determined for the block status data and be compared with the parity data. In some examples, the comparison of block status data to parity data can occur whenever block status data is to be transferred from the register 113 to the non-volatile memory device 130 or every time data is stored within the register 113. In the event that the comparison of the parity value of the block status data and the parity data determines a match, the block status data can be determined to be valid or accurate and the block status data used to determine which blocks to write and/or read memory to or from. Likewise, in the event that the comparison determines a match, the blocks status data can be copied to the non-volatile memory device 130 such that the non-volatile memory device 130 can use the block status data for reading and/or writing data as well. Although described as separate from the register 113, in some embodiments, parity data can be stored partially or entirely within the register 113.

Figure 2:
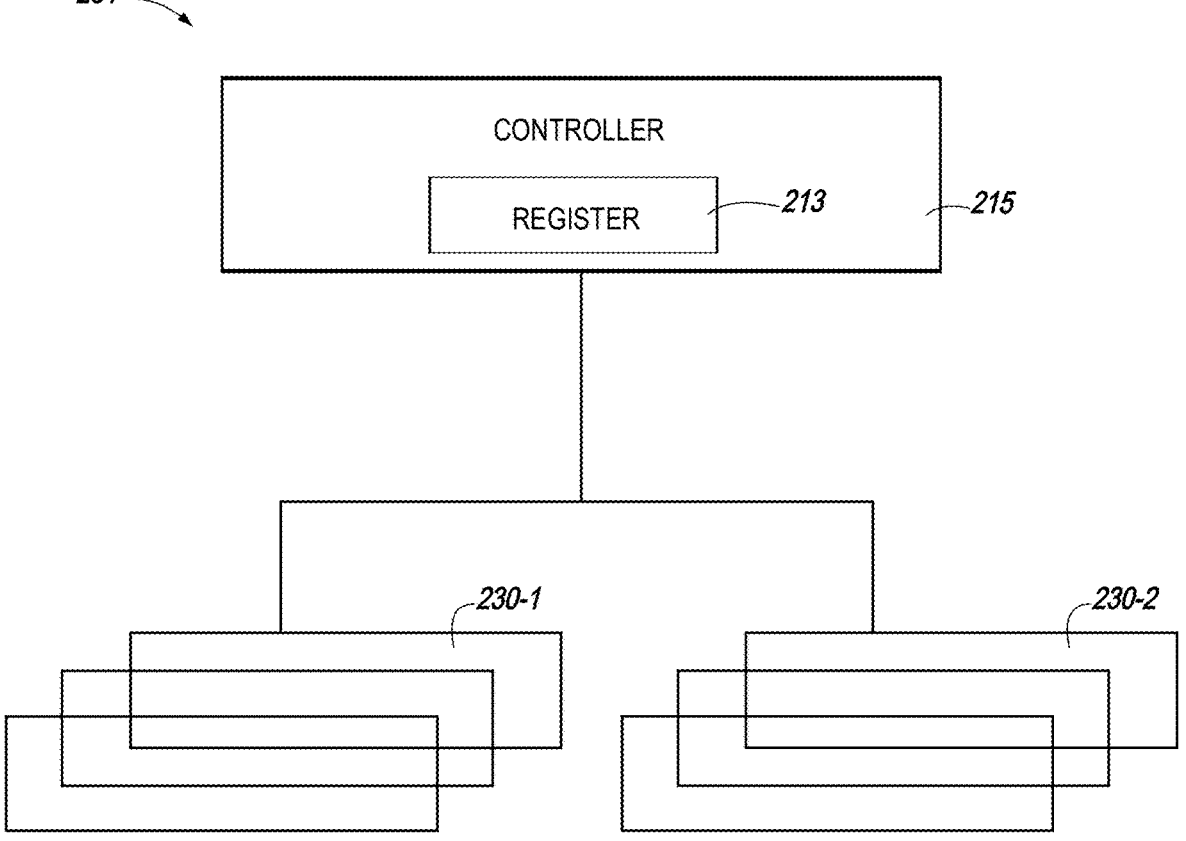
FIG. 2 is an example memory system including block status parity data in accordance with some embodiments of the present disclosure.

FIG. 2 is an example memory system 231 including block status parity data in accordance with some embodiments of the present disclosure. The example memory system 231 can include a memory sub-system controller 215. The memory sub-system controller 215 can store block status data associated with a first portion of blocks of memory cells 230-1 and a second portion of blocks of memory cells 230-2 in the non-volatile memory device (e.g., the non-volatile memory device 130 illustrated in FIG. 1). Although only two portions of blocks of memory cells are illustrated, embodiments are not so limited and an unlimited amount of blocks of memory may be within the non-volatile memory device, whose status data can be stored partially or entirely within the controller 215. The status data can indicate the validity of each block of memory cells. For example, the block status data can indicate whether a block is a good block or a bad block of data, e.g., whether the block is able to properly store data without creating errors or has stopped functioning properly.

The controller 215 can store block status data associated with at least one block of memory 230-1 and 230-2 in the non-volatile memory device within a register 213 (e.g., analogous to the register 113 illustrated in FIG. 1). The block status data can indicate whether the block is a good block or a bad block of the at least one block of memory of the first 230-1 or second 230-2 portions of memory. The register 213 can comprise one or more latches that are configured to indicate whether each block of memory is a good block or a bad block of memory 230-1 and 230-2. The controller 215 can also store parity data within the at least one block of memory of the portions of memory 230-1 and 230-2. The parity data can also indicate the validity of the block status data.

Prior to writing the block status data to the non-volatile memory device, the controller 215 can compare a parity value of the block status data within the register 213 to the parity data. The comparison of block status data to parity data can occur whenever block status data is to be transferred from the register 213 to the non-volatile memory device 230-1, 230-2, every time data is stored within the register 213, and/or any time data is to be read and/or written to the non-volatile memory device 230-1, 230-2. The block status data can be written to the non-volatile memory device 230-1, 230-2 in response to the block status data matching the parity data. For example, a block status data for the at least one block of memory of the portions of memory 230-1 and 230-2 can be stored as a parity value of 1011. The parity value can be stored within the register 213 of the controller 215. The stored parity value can be compared with the parity data, having a parity value of 1011. The matching of the stored parity value and the parity data means the block status data can be written to the non-volatile memory device 230-1, 230-2. If there is a difference between the block status data in the register 213 and the parity data (e.g., does not match the parity data), the block status data is not written to the non-volatile memory device. Instead, the block status data can be determined to be in error and previously stored block status data can be reloaded. For example, a block status data for the at least one block of memory of the portions of memory 230-1 and 230-2 can be stored as a parity value of 1011. The parity value can be stored within the register 213 of the controller 215. The stored parity value can be compared with the parity data, having a parity value of 1101. The stored parity value of 1011 is determined to be an error and the parity data of 1101 is reloaded into the at least one block of memory 230-1 and 230-2. In this way, the block status data can be verified and an error that has been entered into the block status data (e.g., through a latch upset event such as a neutron strike) can be removed.

A latch upset event can be defined as an occurrence that causes a latch to become inadvertently enabled. For example, a latch can flip the data within a cell of at least one block of memory 230-1, 230-2. A latch upset event can cause the controller 215 to identify the at least one block of memory 230-1 and 230-2 within its register as a bad block and prevent access to the at least one block of memory 230-1 and 230-2 within the non-volatile memory even though the at least one block of memory 230-1 and 230-2 within the non-volatile memory is still a good block.

A difference between the block status data in the register 213 and the parity data can be an indicator that a latch upset event has occurred. In one example, a latch upset event can be caused by silicon particles colliding with neutrons within a cell of the at least one block of memory 230-1 and 230-2 (e.g., referred to as a neutron strike). The silicon particle can attract a charge and change the data within the at least one block of memory 230-1 and 230-2. In another example, a latch upset event can be caused by alpha particles colliding with neutrons within a cell of the at least one block of memory 230-1 and 230-2. But embodiments are not so limited, any occurrence that causes a collision with neutrons of cells of the at least one block of memory 230-1 and 230-2 can cause a latch upset event.

Prior to writing the addresses to the non-volatile memory, the controller 215 can compare the block status data to the parity data to determine if the block status data is still valid. If the block status data of the at least one block of memory 230-1 and 230-2 within the register does not match the parity data, that is an indication that the at least one block of memory 230-1 and 230-2 is indeed invalid. The controller 215 can then transfer previously stored block status data (e.g., stored within an OTP memory) to the register 213 prior to transferring the block status data to the non-volatile memory device 230-1, 230-2. However, if the block status data of the at least one block of memory 230-1 and 230-2 within the register matches the parity data, that is an indication that the block status data is valid and can be transferred to the portions of memory 230-1, 230-2 without an update.

Figure 3:
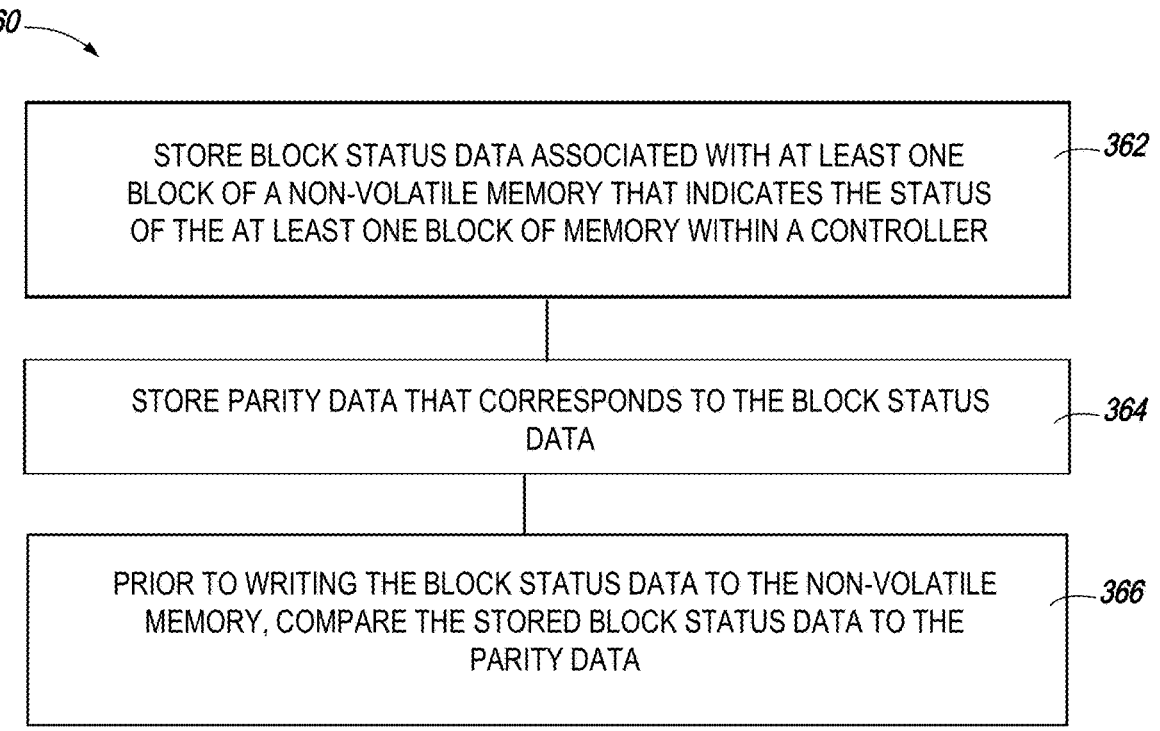
FIG. 3 is a flow diagram of an example method including block status parity data in accordance with some embodiments of the present disclosure.

FIG. 3 is a flow diagram of an example method 360 corresponding to block status parity data in accordance with some embodiments of the present disclosure. The method 360 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 360 can be performed by the memory sub-system controller 115 and 215 of FIGS. 1 and 2 respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 362, the method 360 includes storing block status data associated with at least one block of a non-volatile memory (e.g., the non-volatile memory 130, 230-1, 230-2 illustrated in FIGS. 1-2) that indicates the status of the at least one block of memory (e.g. at least one block of memory 230-1 and 230-2 illustrated in FIG. 2) within the memory sub-system controller (e.g., memory sub-system controller 115 and 215 illustrated in FIGS. 1 and 2, respectively). The status of the at least one block can include being a good block or a bad block. The memory sub-system controller can store block status data associated with at least one block of memory in the non-volatile memory device within a register (e.g., the register 113, 213 illustrated in FIGS. 1-2, respectively). The block status data can indicate the status of the at least one block of memory. An example of the storage process of the block status data is provided in further detail in paragraph 0029-0032 of FIGS. 1 and 2.

At operation 364, the method 360 includes storing parity data that corresponds to the block status data. The parity data can be stored in the controller and/or in the memory device. The parity data can track the block status data for the blocks of memory cells in the non-volatile memory device. The parity data can track which blocks of memory cells in the non-volatile memory device are good or bad blocks. The parity data can be stored within the memory sub-system controller, in a location separate from the register within the memory sub-system controller. An example of the storage process of the parity data is provided in further detail in paragraph 0030, 0033, and 0035 of FIGS. 1 and 2.

At operation 366, the method 360 includes, prior to writing the block status data to the non-volatile memory, comparing the stored block status data to the parity data. The comparison of block status data to parity data can occur whenever block status data is to be transferred from the register to the non-volatile memory device or every time data is stored within the register. In the event that the two values do not match, the block status data can be determined to be in error and previously stored block status data can be reloaded, such as retrieving previously stored block status data from an OTP memory. In the event that the two values do match, a determination that the block status data is still valid can be made and the block status data can be used, e.g., loaded to the memory device to indicate which blocks to use or not use in the memory and/or read or write operations can be sent based on the block status data in the register to avoid using bad blocks. An example of the comparison of block status data to parity data is provided in further detail in paragraph 0030, 0032-0033, and 0035 of FIGS. 1 and 2.

Figure 4:
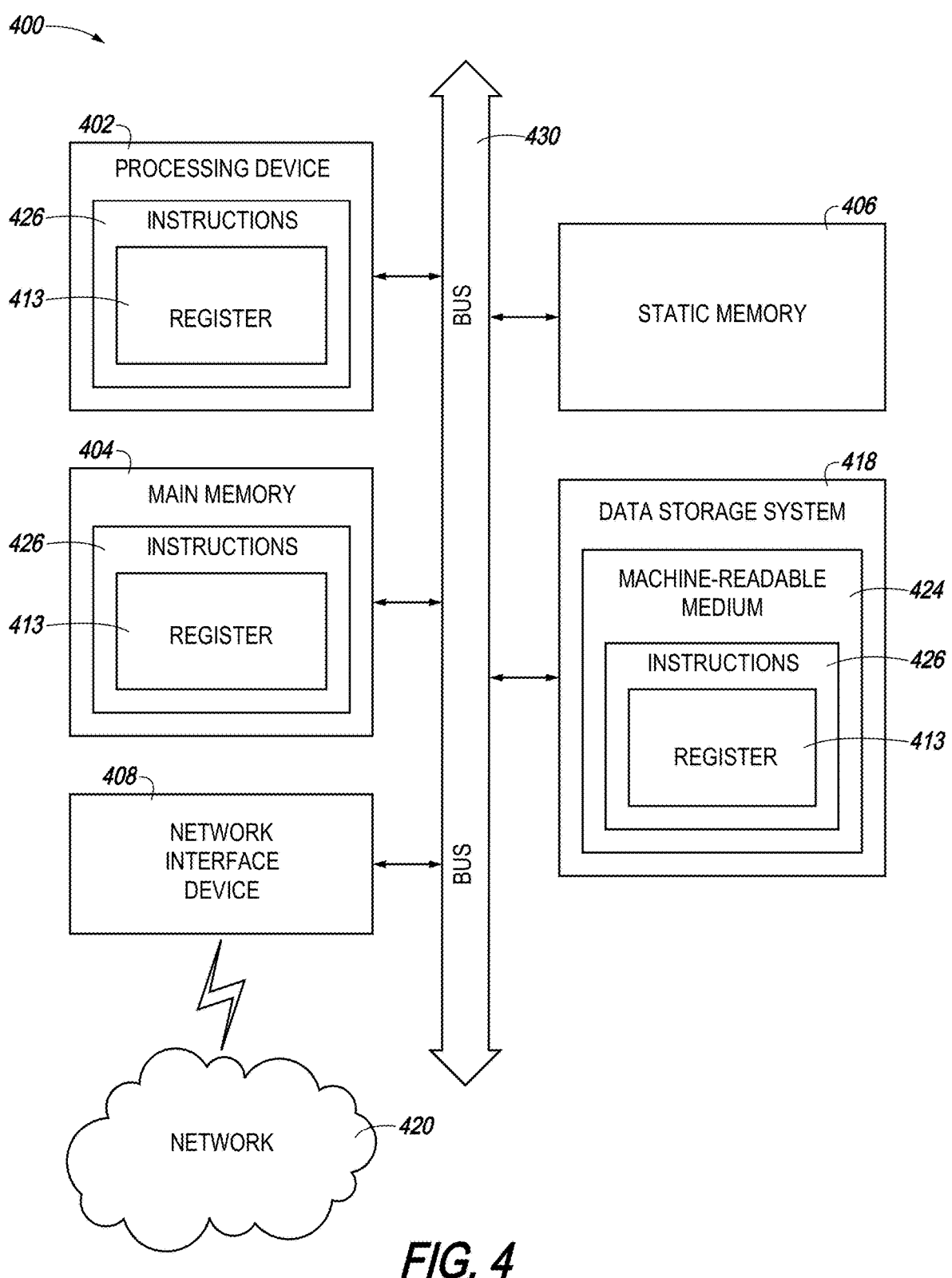
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to store block status data that indicates the validity of at least one block of the non-volatile memory within the register 413). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and stages discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality using data stored in the register 413. While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
storing, in a register within a controller, block status data associated with at least one block of a non-volatile memory that indicates a status of the at least one block;
storing within the controller, parity data that corresponds to the block status data;
receiving and storing block status data associated with another block of the non-volatile memory;
responsive to receiving the block status data associated with the another block, comparing the stored parity data that corresponds to the block status data associated with the at least one block to a determined parity value; and
in response to the stored parity data matching the determined parity value, writing the block status data to the non-volatile memory.

2. The method of claim 1, further comprising not writing the block status data to the non-volatile memory in response to the stored parity data and the determined parity value not matching.

3. The method of claim 1, further comprising, responsive to the stored parity data not matching the determined parity value, reloading previously stored block status-data from an additional memory device.

4. The method of claim 3, wherein the additional memory device is a one-time programming (OTP) memory device.

5. An apparatus, comprising:
a non-volatile memory comprising a plurality of blocks of memory; and
a controller coupled to the non-volatile memory and configured to:
store, within a block status register of the controller, block status data associated with at least one block of the plurality of blocks of the non-volatile memory, wherein the block status data is loaded from a one time programmable memory;
store, within the controller, parity data that corresponds to the block status data;
receive an update that another block of the plurality of blocks is invalid;
responsive to receiving the update, perform a comparison of the stored parity data corresponding to the block status data associated with the at least one block of the non-volatile memory to a determined parity value corresponding to the block status data; and
responsive to the comparison resulting in a mismatch, reload the block status data from the one time programmable memory.

6. The apparatus of claim 5, wherein the controller is configured to write the at least one block of memory to the non-volatile memory responsive to the stored parity data and the determined parity value matching.

7. The apparatus of claim 5, wherein the controller is configured to prevent writing of the at least one block of memory to the non-volatile memory responsive to the stored parity data and the determined parity value not matching.

8. The apparatus of claim 5, wherein the controller is configured to determine that a latch upset event has occurred responsive to an indication that there is a difference between the stored parity data and the determined parity value.

9. An apparatus, comprising:
non-volatile memory; and
a controller coupled with the memory and configured to:
store, within a register of the controller, block status data associated with at least one block of the non-volatile memory that indicates a status of the at least one block-;
store, within the controller, parity data that corresponds to the block status data;
receive and store block status data associated with another block of the non-volatile memory;
responsive to receiving the block status data associated with the another block, compare the stored parity data that corresponds to the block status data associated with the at least one block to a determined parity value;

reload the stored block status data associated with the at least one block responsive to the stored parity data and the determined parity value not matching; and write the stored block status data associated with the another block to the non-volatile memory responsive to the stored parity data matching the determined parity value.

10. The apparatus of claim 9, wherein the controller is configured to prevent access to any block of memory that is determined to be a bad block.

11. The apparatus of claim 10, wherein the controller is configured to restore access to any block of memory responsive to the block status data indicating the any block of memory is a good block.

12. The apparatus of claim 9, wherein the non-volatile memory is a NAND flash memory.

13. The apparatus of claim 9, wherein the apparatus is a solid-state drive (SSD).

\* \* \* \* \*